Jan. 20, 1953  I. A. LAKE  2,626,167
HOSE COUPLING
Filed Aug. 17, 1949
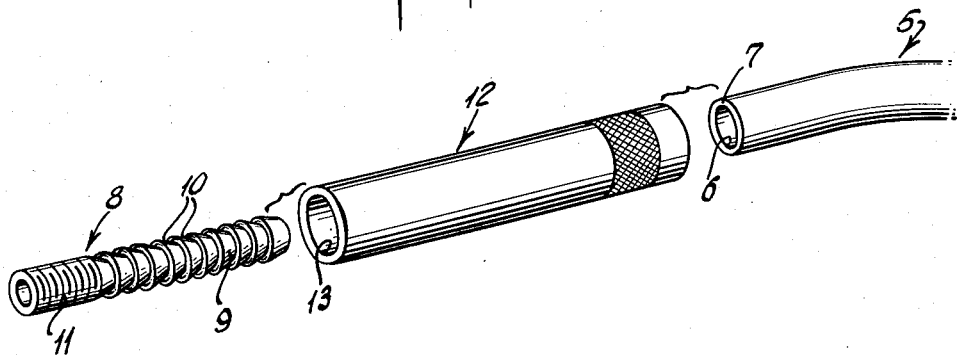
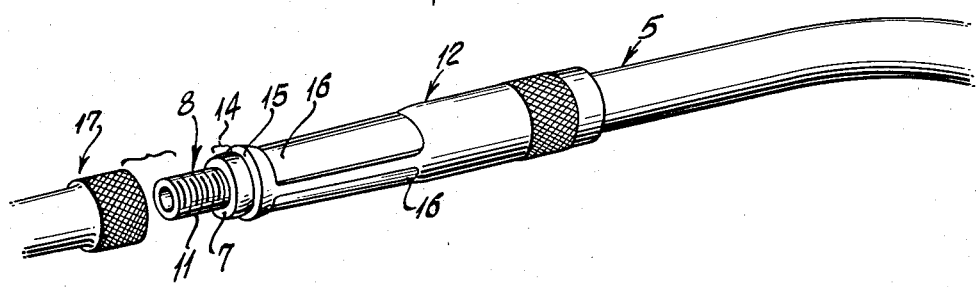
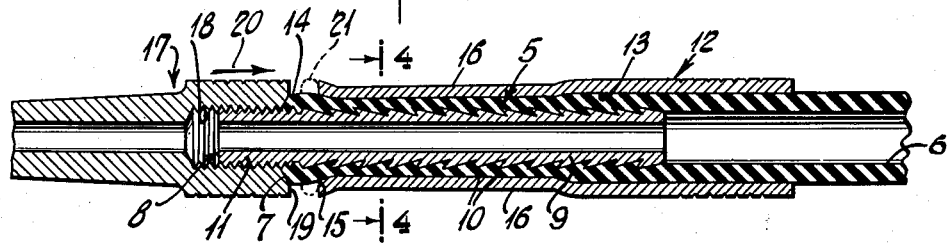
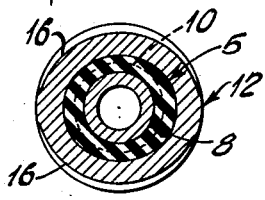
INVENTOR
IRVING A. LAKE.
BY
ATTORNEYS Patented Jan. 20, 1953

2,626,167

UNITED STATES PATENT OFFICE 2,626,167

HOSE COUPLING

Irving A. Lake, Mount Vernon, N. Y., assignor to Orajet Corporation, Wilmington, Del., a corporation of Delaware Application August 17, 1949, Serial No. 110,687

1 Claim. (Cl. 285—84)

The present invention relates to hose couplings and, more particularly, to the type adapted to connect the end of a hose to a fitting of the collar type.

A general object of the present invention is to provide such a hose coupling which securely anchors an end of a hose of resilient material to nipple means and additionally employs the end edge of the hose as a gasketing means when a collar type of connector or fitting is engaged on the nipple, the device being readily and economically constructed of a minium number of parts which can be assembled in a simple and easy manner.

A more specific object of the present invention is to provide such coupling means featured by a nipple tube about one end portion of which a hose end is clamped by anchoring means with the end edge of the hose exposed beyond the latter to provide an encircling gasket at the base of the other end portion of the nipple tube, preferably externally threaded to receive a connector or fitting of the collar type, a gasket seat on the latter being adapted to jam against the exposed end edge of the hose.

A further object of the present invention is to provide a structural embodiment of the device which may be quickly made in economical mass production, and which allows efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claim.

For a fuller understanding of the nature and objects of the invention, reference should be had to the following detailed description taken in connection with the accompanying drawing, in which:

Fig. 1 is an exploded perspective view of parts of an embodiment of the hose coupling of the present invention showing the nipple tube and the clamping sleeve adapted respectively to be inserted in and shrunk about the shown end of the hose;

Fig. 2 is a perspective view of the elements shown in Fig. 1, indicated in their respective relative positions after assembly, and showing a portion of a connector collar means adapted to be threadably mounted on the threaded end of the nipple tube;

Fig. 3 is an enlarged longitudinal section, with parts broken away, of the assembly shown in Fig. 2, showing the connector collar means being threaded down upon the nipple tube; and Fig. 4 is an enlarged sectional view taken substantially on line 4—4 of Fig. 3.

Referring to the drawing, in which like numerals identify similar parts throughout, it will be seen that an end portion 5 of a hose of resilient or elastic material, such as rubber or a suitable plastic, has the usual bore 6 and end edge 7. Nipple tube 8 is provided along the external surface of one end portion 9 with annular steps 10 of known type for a recognized purpose, and with the other end portion 11 externally threaded. The stepped end portion 9 of nipple tube 8 is adapted to be received in the bore 6 of the hose end portion 5. A clamping sleeve 12 is provided with a bore 13 of a diameter readily to receive the hose end 5.

As indicated in Figs. 2 and 3, the hose end 5, the nipple tube 8, and clamping sleeve 12 are assembled together in the following manner. The stepped end 9 of the nipple tube 8 is inserted within the bore 6 of the hose end 5 and clamping sleeve 12 is slid down over the hose to expose a relatively short hose end portion 14 beyond end edge 15 of the sleeve. The sleeve 12, or at least a section thereof, is then shrunk about hose end 5 to clamp it securely against the end portion 9 of nipple tube 8. This shrinking of sleeve 12 preferably is accomplished by a swaging operation with the use of a pair of opposed arcuate jaws which, during the swaging, form a pair of opposed arcuate indentations indicated at 16, 16. Shrinkage of sleeve 12 causes the material of hose end 5 to flow in and about the circular steps 10—10, thereby forming an effective fluid-tight seal. This restrictive squeezing of the end 5 of the resilient hose also causes the small projecting circular portion 14 thereof to be anchored at its root in a fluid-tight manner to the nipple 8 in the vicinity of at least some of the external threads 11, and, of course, locates that hose end portion adjacent the end edge 15 of the clamping sleeve 12.

The coupling device of the present invention is completed by some suitable means to attach the externally-threaded portion 11 of nipple tube 8 to an adjacent section of tubing or to some sort of fluid passage device. For example, such additional coupling element may comprise an internally-threaded connector collar 17, which may be the outer end of hollow handle structure of certain spray apparatus described and claimed in the copending application of Charles L. Hyser, Serial No. 49,711, filed September 17, 1948, entitled, "Dental Fountain Cleaner." Collar 17 has an internally-threaded socket 18 adapted to receive the threaded end 11 of nipple tube 8, and an outer edge face 19 adapted to be jammed up against the end portion 14 of hose 5 as the collar is threaded inward in the direction of the arrow 20 indicated in Fig. 3. With the hose 5 formed of relatively pliable resilient material considerable distortion of the end portion 14 thereof may be accomplished by application of relatively great turning force to collar 17 and, as a result, that end portion of the hose may bulge substantially to a shape indicated in dotted lines at 21 in Fig. 3, to be securely jammed between end face 15 of sleeve 12 and end face 19 of coupling collar 17 to form an effective and highly efficient gasketing device.

It will thus be seen that the objects set forth above, among those made apparent in the preceding description, are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A hose coupling comprising, in combination, a nipple having one end received within an end of a hose of elastic material and a section of the other end provided with external threads for anchoring reception within an internally-threaded connector collar, rigid sleeve means clamped about a section of said hose end to secure it to said nipple with a fluid-tight seal and with a washer-like section of the end of the hose exposed beyond the outer end of said sleeve means and extending over some of the threads at the inner end of the threaded section of said nipple to provide a resilient gasket, and an internally-threaded connector collar mountable on said nipple with a gasket seat on the leading end of said collar jammed against said elastic washer-like end section of said hose when said collar is screwed up onto the threaded section of said nipple to the fullest extent possible and with said washer-like hose section bunched and pinched against said sleeve means outer end.

IRVING A. LAKE.

REFERENCES CITED

The following references are of record in the file of this patent:

UNITED STATES PATENTS

| Number | Name | Date |
|---|---|---|
| 217,894 | Morse | July 29, 1879 |
| 1,200,798 | Bennett | Oct. 10, 1916 |
| 1,760,323 | Shelton | May 27, 1930 |
| 1,954,989 | Eastman | Apr. 17, 1934 |
| 1,970,513 | Knowland | Aug. 14, 1934 |
| 2,479,683 | Hufferd | Aug. 23, 1949 |